(12) United States Patent
Zhang et al.

(10) Patent No.: US 11,638,298 B2
(45) Date of Patent: Apr. 25, 2023

(54) TECHNIQUES FOR PERFORMING RANDOM ACCESS USING MULTIPLE BEAMS IN WIRELESS COMMUNICATIONS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Mostafa Khoshnevisan, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/217,665

(22) Filed: Mar. 30, 2021

(65) Prior Publication Data

US 2021/0315004 A1    Oct. 7, 2021

Related U.S. Application Data

(60) Provisional application No. 63/003,606, filed on Apr. 1, 2020.

(51) Int. Cl.
H04W 74/00      (2009.01)
H04W 16/28      (2009.01)
H04W 74/08      (2009.01)

(52) U.S. Cl.
CPC ......... *H04W 74/008* (2013.01); *H04W 16/28* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 11,310,833 B2* | 4/2022 | Auslender | H04W 74/0833 |
| 2014/0177607 A1* | 6/2014 | Li | H04B 7/0695 370/336 |
| 2018/0139787 A1* | 5/2018 | Islam | H04W 74/0833 |
| 2019/0261298 A1* | 8/2019 | Yoon | H04W 72/0413 |
| 2019/0363843 A1* | 11/2019 | Gordaychik | H04W 52/58 |
| 2019/0373519 A1* | 12/2019 | Yiu | H04W 36/08 |

(Continued)

OTHER PUBLICATIONS

International Search Report and Written Opinion—PCT/US2021/025228—ISA/EPO—Jun. 24, 2021.

*Primary Examiner* — Faiyazkhan Ghafoerkhan
(74) *Attorney, Agent, or Firm* — Arent Fox LLP/Qualcomm Incorporated

(57) ABSTRACT

Aspects described herein relate to determining multiple beams to use in transmitting messages in a random access procedure with one or more transmission/reception points (TRPs) of a cell, and transmitting, to the one or more TRPs of the cell, multiple instances of a first random access message based on the multiple beams, where each of the multiple instances of the first random access message include a preamble portion and a payload portion. In another aspect, a node receiving the multiple instances of the first random access message can determine multiple beams to use in transmitting messages in the random access procedure and can transmit with one or multiple TRPs, to the UE and in response to the first random access message, multiple instances of a second random access message based on the multiple beams.

30 Claims, 10 Drawing Sheets

(56) References Cited

U.S. PATENT DOCUMENTS

| | | | |
|---|---|---|---|
| 2020/0059967 A1* | 2/2020 | Kim | H04L 1/0026 |
| 2020/0187246 A1* | 6/2020 | Amuru | H04J 11/0073 |
| 2020/0187264 A1* | 6/2020 | Charbit | H04W 74/0833 |
| 2020/0236716 A1* | 7/2020 | Lei | H04W 72/042 |
| 2020/0236718 A1* | 7/2020 | Sundararajan | G01S 5/0205 |
| 2020/0252896 A1* | 8/2020 | Lei | H04W 56/001 |
| 2020/0252973 A1* | 8/2020 | Zhang | H04W 74/0833 |
| 2020/0274656 A1* | 8/2020 | Gordaychik | H04L 5/0058 |
| 2020/0275492 A1* | 8/2020 | Lei | H04L 5/0053 |
| 2021/0068157 A1* | 3/2021 | Auslender | H04W 56/0045 |
| 2021/0136713 A1* | 5/2021 | Yoon | H04L 27/26025 |
| 2021/0315004 A1* | 10/2021 | Zhang | H04L 5/0053 |
| 2022/0248385 A1* | 8/2022 | Cha | H04W 52/0216 |

* cited by examiner

TECHNIQUES FOR PERFORMING RANDOM ACCESS USING MULTIPLE BEAMS IN WIRELESS COMMUNICATIONS

CLAIM OF PRIORITY UNDER 35 U.S.C. § 119

The present application for patent claims priority to Provisional Patent Application No. 63/003,606, entitled "TECHNIQUES FOR PERFORMING RANDOM ACCESS USING MULTIPLE BEAMS IN WIRELESS COMMUNICATIONS" filed Apr. 1, 2020, which is assigned to the assignee hereof and hereby expressly incorporated by reference herein for all purposes.

BACKGROUND

Aspects of the present disclosure relate generally to wireless communication systems, and more particularly, to random access procedures.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can use a random access procedure to establish a connection with a base station. A random access procedure can typically include four steps of messages communicated between the UE and base station to establish the connection. Recent proposals have introduced a two-step random access procedure where the UE transmits a first message including a random access preamble and a payload in a shared random access occasion, and the base station receives the first message can transmit a second message including a random access response (e.g., to the random access preamble) and/or contention resolution information. The first message can include two separate transmissions (e.g., in time) of the preamble and payload portions of the message, and the gap between the preamble transmission and the payload transmission is configurable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes determining multiple beams to use in transmitting messages in a random access procedure with one or more transmission/reception points (TRPs) of a cell, and transmitting, to the one or more TRPs of the cell, multiple instances of a first random access message based on the multiple beams, wherein each of the multiple instances of the first random access message include a preamble portion and a payload portion.

In another example, a method for wireless communication is provided. The method includes receiving with one or multiple TRPs, from a user equipment (UE) as part of a random access procedure, one or more instances of a first random access message, wherein each of the one or more instances of the first random access message include a preamble portion and a payload portion, determining multiple beams to use in transmitting messages in the random access procedure, and transmitting with one or multiple TRPs, to the UE and in response to the first random access message, multiple instances of a second random access message based on the multiple beams.

In a further example, an apparatus for wireless communication is provided that includes a transceiver, a memory configured to store instructions, and one or more processors coupled (e.g., communicatively, operationally, electrically, electronically, or otherwise) with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an aspect, an apparatus for wireless communication is provided that includes a transceiver, a memory configured to store instructions, and one or more processors coupled (e.g., communicatively, operationally, electrically, electronically, or otherwise) with the memory and the transceiver. The one or more processors are configured to determine multiple beams to use in transmitting messages in a random access procedure with one or more TRPs of a cell, and transmit, to the one or more TRPs of the cell, multiple instances of a first random access message based on the multiple beams, wherein each of the multiple instances of the first random access message include a preamble portion and a payload portion.

In another aspect, an apparatus for wireless communication is provided that includes a transceiver, a memory configured to store instructions, and one or more processors coupled (e.g., communicatively, operationally, electrically, electronically, or otherwise) with the memory and the transceiver. The one or more processors are configured to receive with one or multiple TRPs, from a UE as part of a random access procedure, one or more instances of a first random access message, wherein each of the one or more instances of the first random access message include a preamble portion and a payload portion, determine multiple beams to use in transmitting messages in the random access procedure, and transmit with one or multiple TRPs, to the UE and in response to the first random access message, multiple instances of a second random access message based on the multiple beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
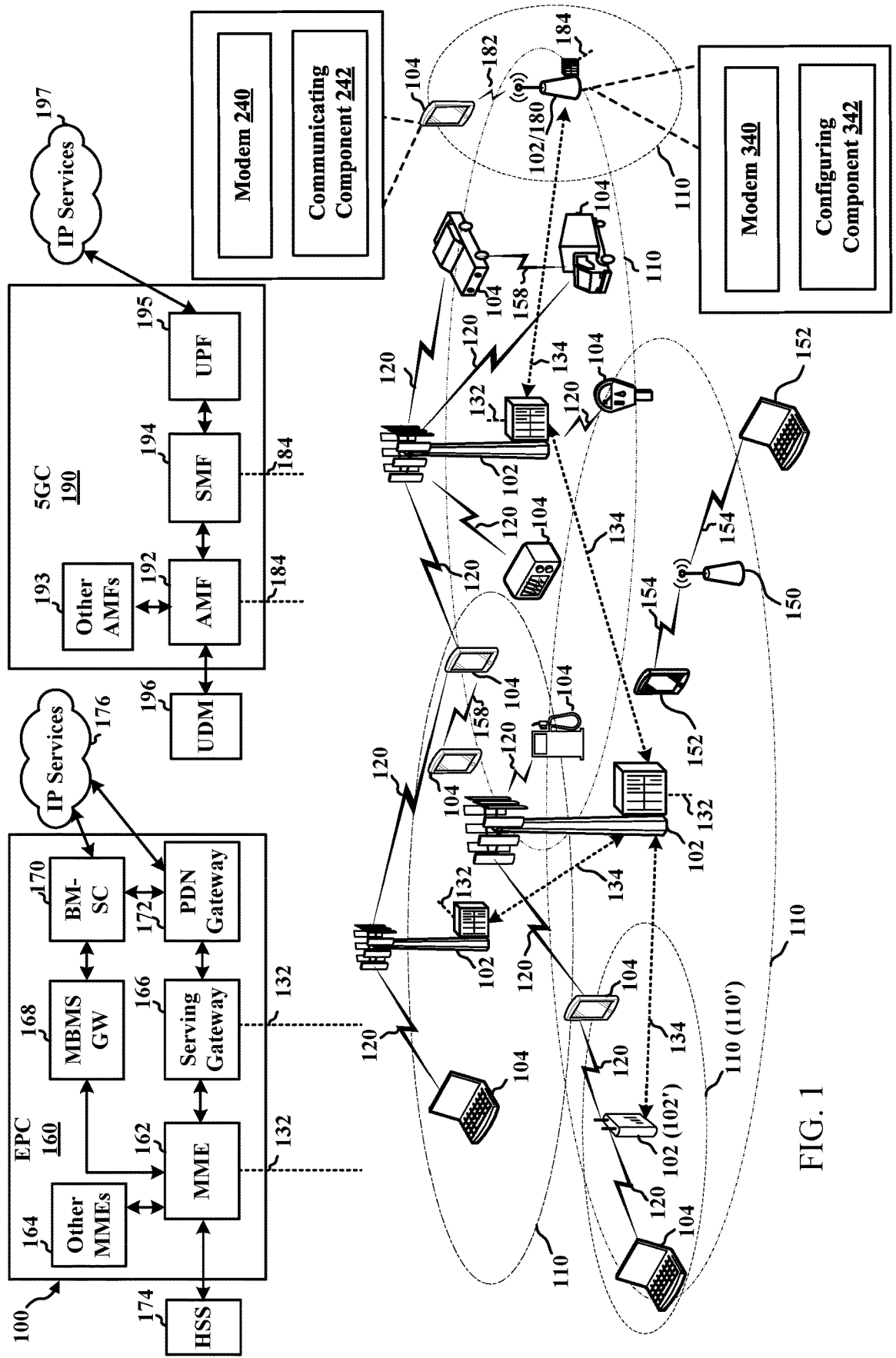
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to transmitting messages in a two-step random access procedure using multiple beams to improve reliability thereof, though the concepts may be applied to random access procedures with more or less than two steps as well. In two-step random access procedures, a base station can broadcast signals with parameters for establishing a connection with the base station. Such signals may include a synchronization signal (SS) block (SSB), system information blocks (SIBs), reference signals (RSs), and/or the like, which may be transmitted in a primary broadcast channel (PBCH) block. A user equipment (UE) can receive the broadcast signals and can synchronize with the downlink from the base station, perform system information decoding and measurement, and/or the like. In addition, in contention-based random access (CBRA), the UE can determine, based on parameters in the broadcast signals, one or more random access occasions for transmitting random access messages to establish a connection with the base station. In contention-free random access (CFRA), the base station can assign a random access occasion and/or related parameters (e.g., random access preamble) to the UE.

In any case, when the UE desires to establish a connection with the base station, the UE can transmit a first message of the two-step random access procedure (also referred to herein as "msgA"), which may include a preamble portion and a payload portion (e.g., where the payload portion can include physical uplink shared channel (PUSCH) data), and these portions may be transmitted as separated by a transmission gap in time. The base station can receive the first message (e.g., as the preamble and payload portions) and can transmit a response message to the UE (also referred to herein as "msgB"), where the response message can include a random access response. In CBRA, the response message may also include contention resolution information.

In a specific example, in fifth generation (5G) new radio (NR), the UE can select the type of random access (RA) at initiation of the random access procedure based on network configuration. For example, where the UE is not configured with CFRA resources, the UE can use a reference signal received power (RSRP) threshold to select between two-step RA type and four-step RA type. Where the UE is configured with CFRA resources for four-step RA type, in this example, the UE can perform random access with four-step RA type, or where the UE is configured with CFRA resources for two-step RA type, the UE can perform random access with two-step RA type. The network may not configure CFRA resources for four-step and two-step RA types at the same time for a Bandwidth Part (BWP). In addition, for example, CFRA with two-step RA type may only be supported for handover. Furthermore, for example, the UE can perform carrier selection (uplink (UL) or supplemental uplink (SUL)) before selecting between two-step and four-step RA type. The RSRP threshold for selecting between two-step and four-step RA type can be configured separately for UL and SUL.

In addition, for example, two-step RA can include a fallback scenario when the RA procedure fails. In this example, if fallback indication is received in in the second random access message, the UE can perform third message transmission (e.g., as would be sent as part of a four-step RA procedure) and can monitor for a contention resolution (e.g., as would be sent as the fourth message in a four-step RA procedure). If contention resolution is not successful after transmission and/or one or more retransmissions of the third RA message, the UE can revert to transmitting the first random access message of the two-step RA procedure (msgA). If the random access procedure with two-step RA type is not completed after a number of msgA transmissions, the UE can be configured to switch to CBRA with 4-step RA type.

In this example, the fallback random access response (fallbackRAR) message can have the same media access control (MAC) format as the second message (random access response (RAR)) of four-step RA procedure. The success RAR (successRAR) can have a format with multiple fields including UE Contention Resolution Identity, transmit power control (TPC), hybrid automatic repeat/request (HARM) Feedback Timing Indicator, physical uplink control channel (PUCCH) resource indicator, timing advance (TA) command, cell radio network temporary identifier (C-RNTI), etc. For example, the UE Contention Resolution Identity can include the UL common control channel (CCCH) service data unit (SDU). If the UL CCCH SDU is longer than 48 bits, the field can include the first 48 bits of the UL CCCH SDU. In an example, TPC can include the TPC command for the PUCCH resource containing HARQ feedback for msgB. HARQ Feedback Timing Indicator can include the physical downlink shared channel (PDSCH)-to-HARQ feedback timing indicator field for msgB HARQ feedback. PUCCH resource Indicator can include the PUCCH resource indicator for HARQ feedback for msgB. Timing Advance Command can include the index value TA used to control the amount of timing adjustment that the MAC entity applies.

In an example, the UE can be configured to communicate with multiple cell groups in multiple connectivity (referred to as dual connectivity (DC) for two cell groups). For example, the cell groups can include a master cell group (MCG) and one or more secondary cell groups (SCGs). For an MCG, the UE can be configured to communicate with an associated primary cell (PCell) and/or one or more associated secondary cells (SCells). For an SCG, the UE can be configured to communicate with an associated primary cell (PSCell) and/or one or more associated secondary cells. Once the UE has established communication with the PCell, it can be configured to establish communication with one or more PSCells of the one or more SCGs. For example, PCell can configure the UE for layer 3 (L3) measurement on PSCell. UE can measure PSCell SSBs in corresponding SS/PBCH block measurement time configuration (SMTC) windows. UE can send L3 beam report to PCell via event trigger or periodic report, and based on L3 report, PCell can initiate PSCell addition procedure for the UE. The UE can receive PSCell RA channel (RACH) configuration from PCell, can identify a best downlink (DL) reference signal (RS) beam received from the PSCell, and can send a first random access message (e.g., msgA in two-step RA procedure or Msg 1 in four-step RA procedure) to the PSCell in a corresponding RACH occasion. Other random access messages can be exchanged based on the same RS beam to complete the random access procedure.

Aspects described herein relate to using multiple beams to transmit the random access messages in the random access procedure (e.g., using beam sweeping). Beam sweeping can generally refer to a transmitting device transmitting/receiving multiple beams separated in time, frequency, space, etc., such that a receiving device may receive at least one of the multiple beams and/or can determine an optimal beam for communicating with the transmitting device. Using multiple beams to transmit/receive random access messages in this regard can enhance reliability of the random access procedure by improving the likelihood that messages are successfully communicated and can in turn reduce latency by improving the likelihood of random access procedure success (e.g., making the fallback and retransmission scenario less likely).

In some aspects described herein, it is proposed to enhance reliability and reduce latency at least for two-step RACH with beam sweeping in SCG in NR-DC in non-standalone (NSA) mode. For example, the UE can exchange messages using beam sweeping with one or multiple transmission/reception points (TRPs) of serving cell, where the serving cell can be PSCell or SCell or PCell, etc. In addition, for example, beam sweeping can be provided using time division multiplexing (TDM), frequency division multiplexing (FDM), or space division multiplexing (SDM) to separate the beams. Also, in an example, a beam pool index may help solve possible beam pairing misalignment, which may happen for both single TRP and multiple TRP (mTRP)-based beam sweeping. In case of mTRP, different pool index can help UE to select RACH beams from different TRPs with large angle of departure (AoD), which may be helpful for UL interference diversity. In case of mTRP, different pool index may also help load balance where RACH messages may help to select the TRP(s) with no urgent traffic. In addition, for example, in using joint RACH across beam sweeps, as long as one path among the multiple transmissions of different random access message exchanges can succeed, initial access can be successfully completed, which can help avoid failure due to burst UL/DL inter-cell interference, avoid blockage during initial access procedure, and provide for efficient PSCell setup (e.g., reduce RACH latency, with reduced failure or retransmissions), etc.

The described features will be presented in more detail below with reference to FIGS. 1-10.

As used in this application, the terms "component," "module," "system" and the like are intended to include a computer-related entity, such as but not limited to hardware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for performing a random access procedure based on multiple beams, in accordance with aspects described herein. In addition, some nodes may have a modem 340 and configuring component 342 for configuring a device for performing a random access procedure based on multiple beams, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can initiate a two-step random access procedure with a base station 102 by transmitting a first random access message (msgA) based on multiple transmit beams, which can include multiple transmissions of a preamble portion and multiple transmission of a payload portion based on the multiple beams. Configuring component 342 can receive the first random access message and determine to transmit a second random access message (msgB) based on multiple transmit beams, which can include multiple transmissions of a control channel portion (e.g., physical downlink control channel (PDCCH)) and/or multiple transmissions of a data channel portion (e.g., physical downlink shared channel (PDSCH)). Communicating component 242 can receive the second random access message, and can in some examples complete the random access procedure and begin communicating with the base station 102 over configured resources. In an example, communicating component 242 can also transmit feedback for the second random access message using multiple transmit beams. Using multiple beams for the various random access messages can improve reliability of communications, reduce latency associated with the communications, etc.

Figure 2:
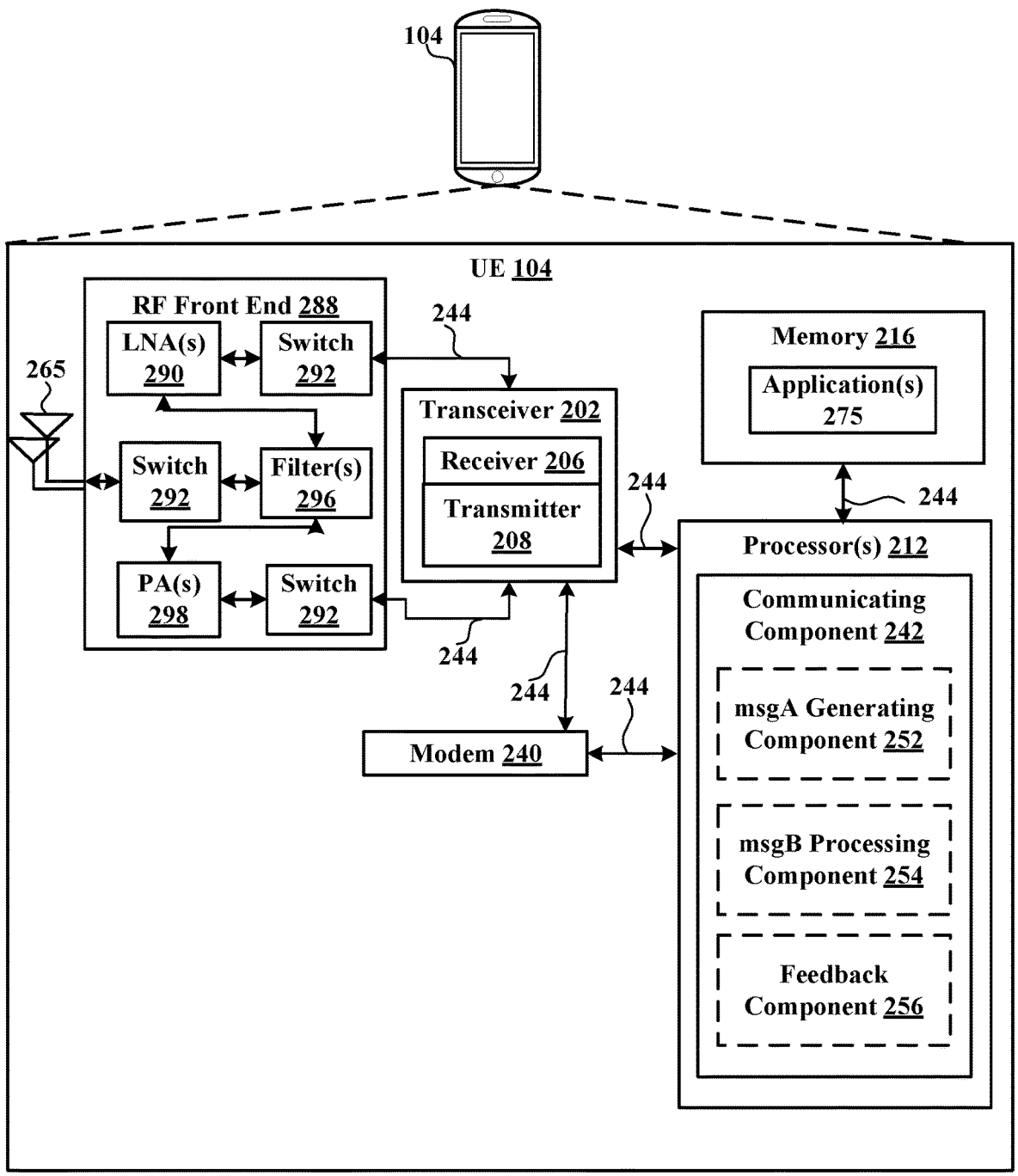
FIG. 2 is a block diagram illustrating an example of a UE, in accordance with various aspects of the present disclosure.
Figure 3:
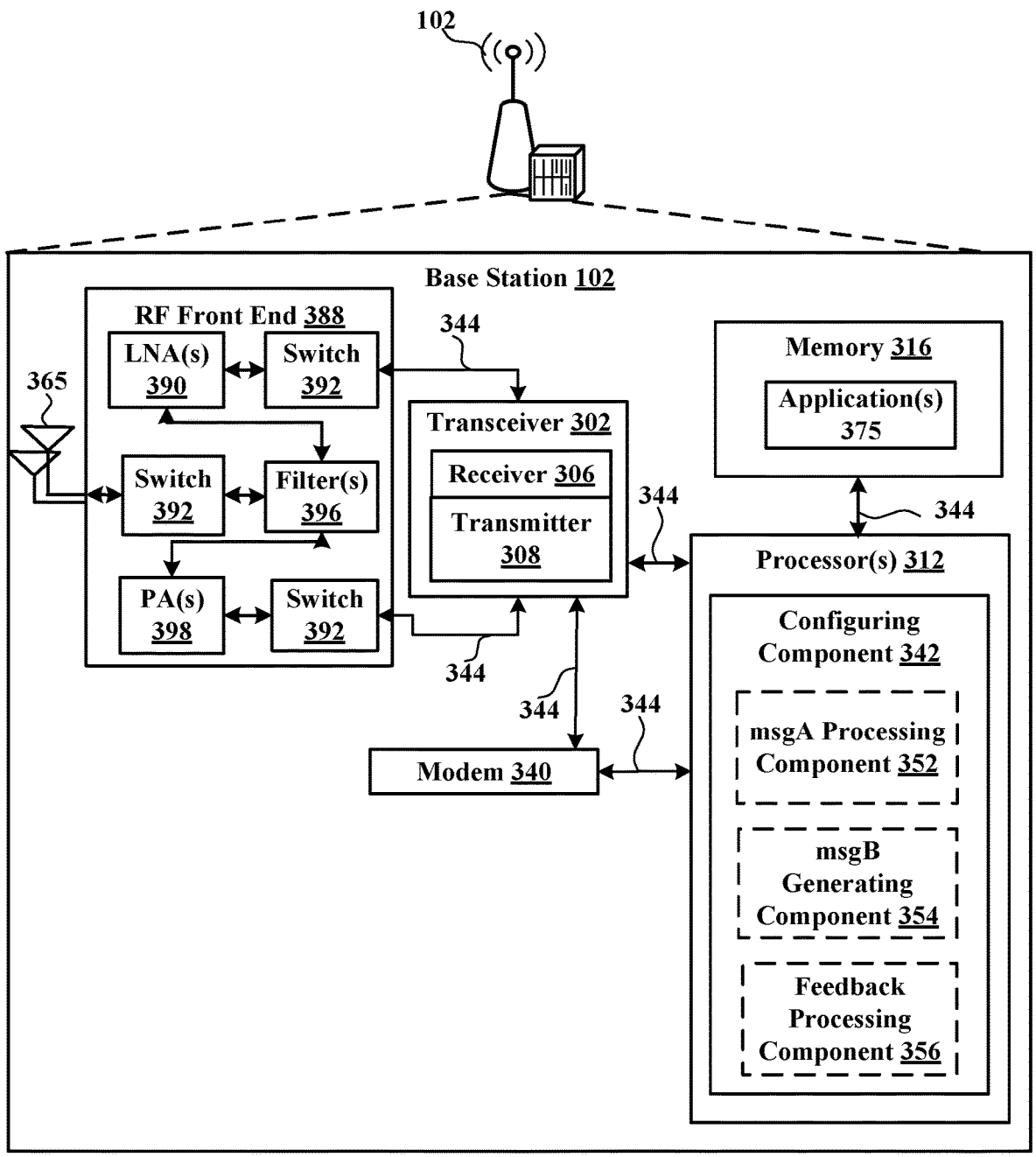
FIG. 3 is a block diagram illustrating an example of a base station, in accordance with various aspects of the present disclosure.
Figure 4:
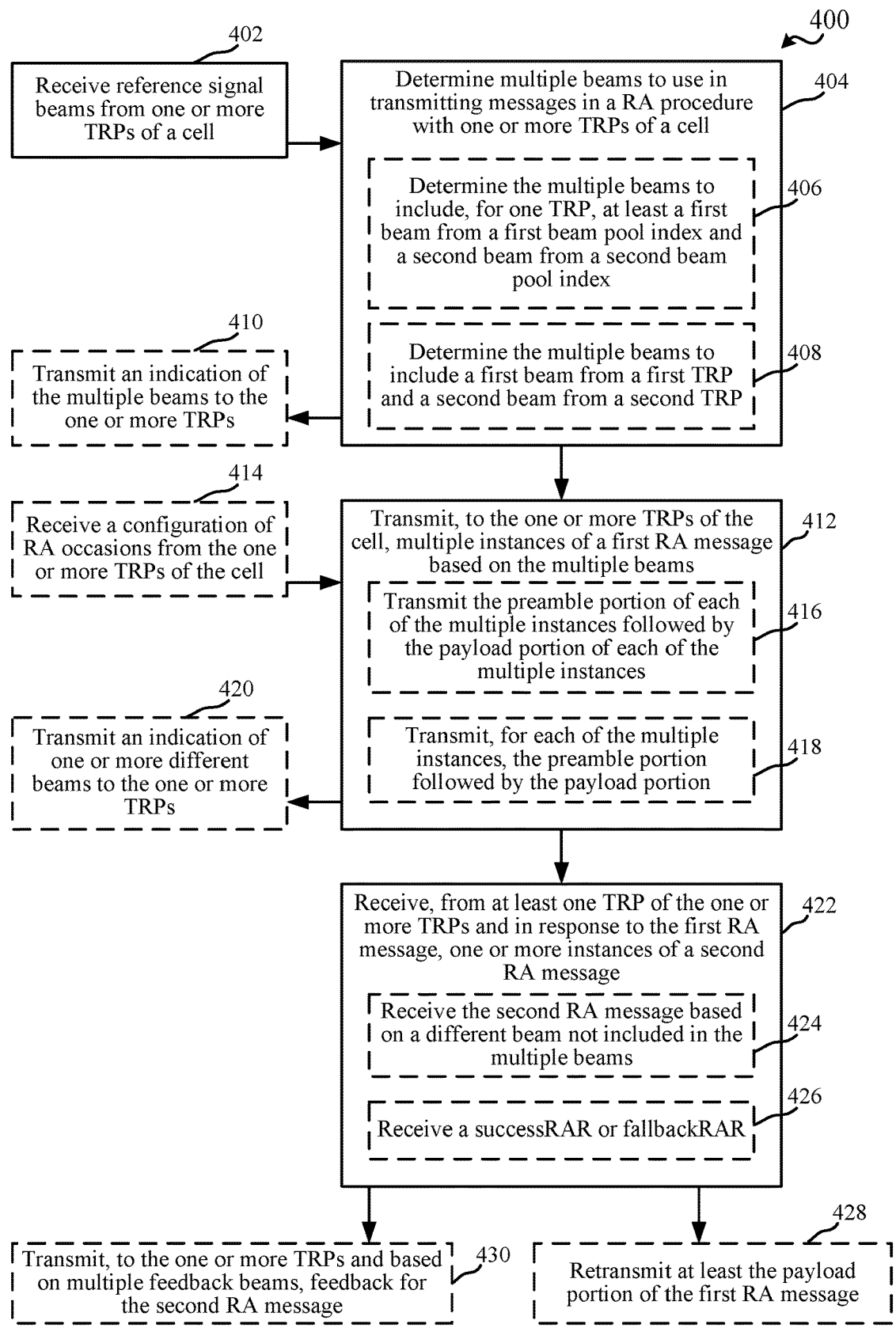
FIG. 4 is a flow chart illustrating an example of a method for transmitting a first random access message based on multiple beams, in accordance with various aspects of the present disclosure.
Figure 5:
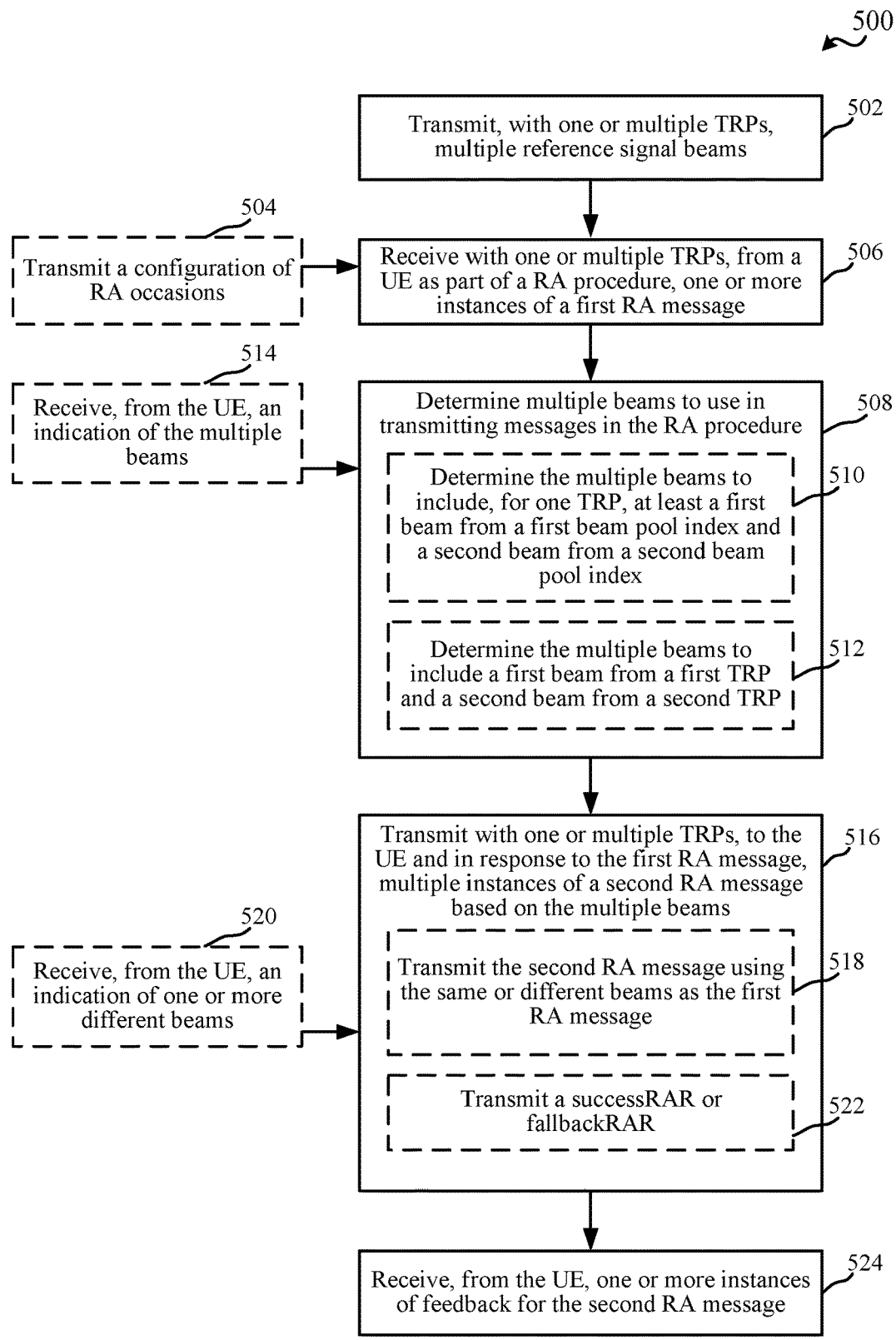
FIG. 5 is a flow chart illustrating an example of a method for transmitting a second random access message based on multiple beams, in accordance with various aspects of the present disclosure.

Turning now to FIGS. 2-10, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing a random access procedure based on multiple beams, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, and/or software code (e.g., executable by a processor) for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, and/or software code (e.g., executable by a processor) for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a msgA generating component 252 for generating a first random access message to transmit using multiple beams, a msgB processing component 254 for receiving and decoding a second random access message based on the first random access message, and/or a feedback component 256 for generating feedback for the second random access message to transmit using multiple beams, in accordance with aspects described herein.

In an aspect, the processor(s) 212 may correspond to one or more of the processors described in connection with the UE in FIG. 10. Similarly, the memory 216 may correspond to the memory described in connection with the UE in FIG. 10.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a device for performing a random access procedure based on multiple beams, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a msgA processing component 352 for receiving and processing a first random access message in a two-step random access procedure, a msgB generating component 354 for generating a second random access message for transmitting in response to the first random access message and using multiple transmit beams, and/or a feedback processing component 356 for receiving and processing feedback for the second random access message, in accordance with aspects described herein.

In an aspect, the processor(s) 312 may correspond to one or more of the processors described in connection with the base station in FIG. 10. Similarly, the memory 316 may correspond to the memory described in connection with the base station in FIG. 10.

FIG. 4 illustrates a flow chart of an example of a method 400 for performing a random access procedure with one or more TRPs of a cell, in accordance with aspects described herein. FIG. 5 illustrates a flow chart of an example of a method 500 for performing a random access procedure with a UE via one or more TRPs of a cell, in accordance with aspects described herein. In an example, a UE can perform the functions described in method 400 using one or more of the components described in FIGS. 1 and 2. In an example, a base station 102 and/or a cell, via one or more TRPs, can perform the functions described in method 500 using one or more of the components described in FIGS. 1 and 3. Methods 400 and 500 are described below in conjunction with one another to ease explanation of the associated functions and concepts. Methods 400 and 500 are not required to be performed in conjunction with one another, and indeed one device can be configured to perform method 400 without having a corresponding device that performs method 500 and vice versa, in at least one example.

In an example, one or more TRPs can provide a cell (e.g., a PCell, PSCell, SCell, etc.) by providing, via each TRP, concurrent communications (e.g., where there are multiple TRPs) related to the cell. In this example, the UE 104 can receive and process concurrent communications from multiple TRPs for communicating in the cell.

In method 500, at Block 502, multiple reference signal beams can be transmitted with one or multiple TRPs. In an aspect, configuring component 342, e.g., in conjunction with processor(s) 312, memory 316, transceiver 302, etc., can transmit, with one or multiple TRPs, multiple reference signal beams. For example, configuring component 342 of a base station 102 (or multiple base stations 102 or related TRPs) that form a cell (e.g., a PCell, PSCell, SCell, etc.) can transmit the multiple reference signal beams. For example, the reference signal beams can include reference signals corresponding to a physical broadcast channel (PBCH), such as a synchronization signal block (SSB), channel state information reference signal (CSI-RS), etc., that are beamformed in different beamforming directions to improve likelihood of a UE 104 receiving the reference signals with desirable signal quality. Beamforming, as performed by the base station 102 or by a UE 104 described further herein, can generally include, or relate to, modifying antenna resources to achieve a spatial direction (or antenna power aimed at a spatial direction) for transmitting or receiving signals. In an example, beams may be configured by a base station 102 to a UE 104 (e.g., in RRC signaling, dedicated control signaling, or other signaling), indicated or implemented in a UE 104 based on a wireless communication technology, and/or the like. In one example, various beams can be specified in a wireless communication technology, and a base station 102 can downselect from the various beams to configure a subset of beams that can be used in communications between the base station 102 and UE 104.

In one example, a TRP can transmit the multiple reference signals using beams belonging to a single or multiple pool indices. In addition, for example, multiple TRPs can transmit multiple reference signals using beams belonging to each TRP. In addition, configuring component 342 can transmit the multiple reference signal beams using FDM, TDM, or SDM to separate the reference signal beams in frequency, time, or space. For example, whether to use one or more of FDM, TDM, or SDM may be selected based on a scheme selection indicator configured for the UE 104 and/or a configured repetition value for the beams.

In method 400, at Block 402, the UE can receive reference signal beams from one or more TRPs of a cell. In an aspect, communicating component 242, e.g., in conjunction with processor(s) 212, memory 216, transceiver 202, etc., can receive reference signal beams from one or more TRPs of a cell. As described, the one or more TRPs can transmit reference signal beams including reference signals over a PBCH, such as SSB, CSI-RS, etc., and the communicating component 242 can receive at least one or some of the beams, and/or can determine desirable beams for communicating with the one or more TRPs of the cell. In addition, communicating component 242 can receive the reference signal beams based on a configuration from the cell, which may include radio resource control (RRC) configuration defining and/or configuring RS index per beam pool index. For example, the configuration can specify multiple beam pools with multiple RS indices, and the UE 104 can accordingly receive and process RSs according to the configuration. For example, the UE 104 can use the configuration to identify received beams based on a known beam identifier for a beam received in a certain period of time, and can use the identifier to indicate a desirable beam for communicating with the cell.

In method 400, at Block 404, the UE can determine multiple beams to use in transmitting messages in a RA procedure with one or more TRPs of a cell. In an aspect, msgA generating component 252, e.g., in conjunction with processor(s) 212, memory 216, transceiver 202, communicating component 242, etc., can determine the multiple beams to use in transmitting messages in the RA procedure with the one or more TRPs of the cell. For example, msgA generating component 252 can determine or identify the multiple beams based on beams received from the one or more TRPs of the cell. In determining the multiple beams, msgA generating component 252 can receive the beams, as described above, and/or measure one or more parameters of the beams, such as signal strength or quality metrics (e.g., reference signal received power (RSRP), reference signal received quality (RSRQ), received signal strength indicator (RSSI), signal-to-noise ratio (SNR), signal-to-interference-and-noise ratio (SINR), etc.).

In one example, in determining the multiple beams at Block 404, optionally at Block 406, the UE can determine the multiple beams to include, for one TRP, at least a first beam from a first beam pool index and a second beam from a second beam pool index. In an aspect, msgA generating component 252, e.g., in conjunction with processor(s) 212, memory 216, transceiver 202, communicating component 242, etc., can determine the multiple beams to include, for one TRP, at least the first beam from the first beam pool index and the second beam from the second beam pool index. For example, msgA generating component 252 can determine the multiple beams for a given TRP to include beams from different beam pool indices. For example, the TRP can broadcast beams from different beam pools by transmitting a number of beams (e.g., four beams) from a first pool, followed by the number of beams from the second pool, etc. In this example, msgA generating component 252 can determine at least one beam from a first beam pool (and associated beam pool index) and at least one beam from a second pool (and associated beam pool index) to use in transmitting random access messages.

In one example, in determining the multiple beams at Block 404, optionally at Block 408, the UE can determine the multiple beams to include a first beam from a first TRP and a second beam from a second TRP. In an aspect, msgA generating component 252, e.g., in conjunction with processor(s) 212, memory 216, transceiver 202, communicating component 242, etc., can determine the multiple beams to include the first beam from the first TRP and the second beam from the second TRP. For example, msgA generating component 252 can determine the multiple beams to include beams from different TRPs. For example, each TRP can broadcast beams from one or more beam pools by transmitting a number of beams (e.g., four beams) from a first TRP, followed by the number of beams from the second TRP, etc. In this example, msgA generating component 252 can determine at least one beam from the first TRP and at least one beam from the second TRP to use in transmitting random access messages.

In one example, in method 400, optionally at Block 410, the UE can transmit an indication of the multiple beams to the one or more TRPs. In an aspect, msgA generating component 252, e.g., in conjunction with processor(s) 212, memory 216, transceiver 202, communicating component 242, etc., can transmit the indication of the multiple beams to the one or more TRPs. For example, msgA generating component 252 can transmit the indication of the multiple beams in a report to the one or more TRPs to inform the one or more TRPs of desirable beams at the UE 104. For example, the indication may include a beam identifier to identify each of the multiple beams. The beam identifier may include an identifier (e.g., an index) of a beam within a beam pool, a beam pool index of the beam pool, or other identifier. For example, an index of a beam within a beam pool can be determined and/or specified based on an order by which the beams are received in a period of time. In an example, the one or more TRPs can use this information in determining beams for transmitting random access messages to the UE 104, in determining beams to indicate the UE to use in transmitting to the one or more TRPs (e.g., in transmitting feedback for random access messages from the one or more TRPs), and/or the like, as described herein.

In method 400, at Block 412, the UE can transmit, to the one or more TRPs of the cell, multiple instances of a first RA message based on the multiple beams. In an aspect, communicating component 242, e.g., in conjunction with processor(s) 212, memory 216, transceiver 202, etc., can transmit, to the one or more TRPs of the cell, the multiple instances of the first RA message based on the multiple beams. For example, communicating component 242 can transmit the multiple instances of the first RA messages to include, for each instance, at least one preamble portion and one or multiple payload portions, where each instance can be transmitted based on (e.g., using) one of the multiple beams. In one example, UE 104 can be configured with RA occasions during which to transmit the multiple instances of the first random access message. In an example, the RS beams transmitted by the one or more TRPs or other signals can indicate the RA occasions that can be used to transmit the RA messages. In an example, UE 104 can be configured with a scheme selection indicator to indicate whether the beams transmitted by the UE 104 are to be transmitted based on a FDM scheme, a TDM scheme, or a SDM scheme, and/or a repetition factor for transmitting the beams. In addition, the UE 104 can be configured with the corresponding RA occasions for transmitting the multiple instances of the first RA message.

For example, in method 500, optionally at Block 504, a configuration of RA occasions can be transmitted. In an aspect, configuring component 342, e.g., in conjunction with processor(s) 312, memory 316, transceiver 302, etc., can transmit (e.g., via one or more TRPs of the cell) the configuration of RA occasions (e.g., to the UE 104). For example, configuring component 342 can transmit the configuration of RA occasions in one or more of the RS beams transmitted at Block 502 or in other signaling to configure the UE 104 with time and/or frequency resources for transmitting the first RA message (or multiple instances of the first RA message). For example, the configuration can indicate the scheme selection indicator and/or the repetition factor. In one example, a base station or one or more TRPs providing a PCell can transmit the configuration to the UE 104. In addition, for example, configuring component 342 can transmit the configuration in RRC signaling, dedicated control signaling, broadcast signaling, etc.

In this example, in method 400, optionally at Block 414, a configuration of RA occasions can be received from one or more TRPs of the cell. In an aspect, communicating component 242, e.g., in conjunction with processor(s) 212, memory 216, transceiver 202, etc., can receive the configuration of RA occasions from the one or more TRPs of the cell. For example, the configuration may indicate resources for transmitting first random access messages (e.g., or at least a preamble portion thereof). In an example, the configuration may also indicate the scheme selection indicator for FDM, TDM or SDM of multiple instances of the first RA message and/or a repetition factor. In an example, communicating component 242 may determine the resources for transmitting the multiple instances of the first RA message based on the configuration. For example, communicating component 242 can determine a number of multiple instances to transmit, resources for transmitting at least a preamble portion for each of the multiple instances, etc. In one example, communicating component 242 can derive the resources for transmitting each of the multiple instances based on an indication of resources for a first instance (e.g., an indication of time and/or frequency resources specified in the configuration) and additionally based on the scheme selection indicator (e.g., determining frequency for FDM, time for TDM, space for SDM, etc.), based on the number of repetitions (e.g., determining resources for each repetition based on the resources for the first instance and a spacing in frequency, time, space, etc.), and/or the like. Moreover, communicating component 242 can select the RA occasions that are linked (e.g., as specified in a configuration received from the base station 102) to specific RS beams the TRPs use to receive the multiple first RA messages and the corresponding RS beams the UE uses to transmit the multiple first RA messages.

In one example, in transmitting the multiple instances of the first RA message at Block 412, optionally at Block 416, the UE can transmit the preamble portion of each of the multiple instances followed by the payload portion of each of the multiple instances. In an aspect, communicating component 242, e.g., in conjunction with processor(s) 212, memory 216, transceiver 202, etc., can transmit the preamble portion of each of the multiple instances followed by the payload portion of each of the multiple instances. In this example, communicating component 242 can transmit a preamble portion of a first instance based on a first beam, followed by a preamble portion of a second instance based on a second beam, etc. After transmitting the preamble portions, communicating component 242 can transmit one or more transmissions of a payload portion of the first instance based on the first beam, followed by one or more transmissions a payload portion of the second instance based on the second beam, etc. An example is shown in FIG. 6.

Figure 6:
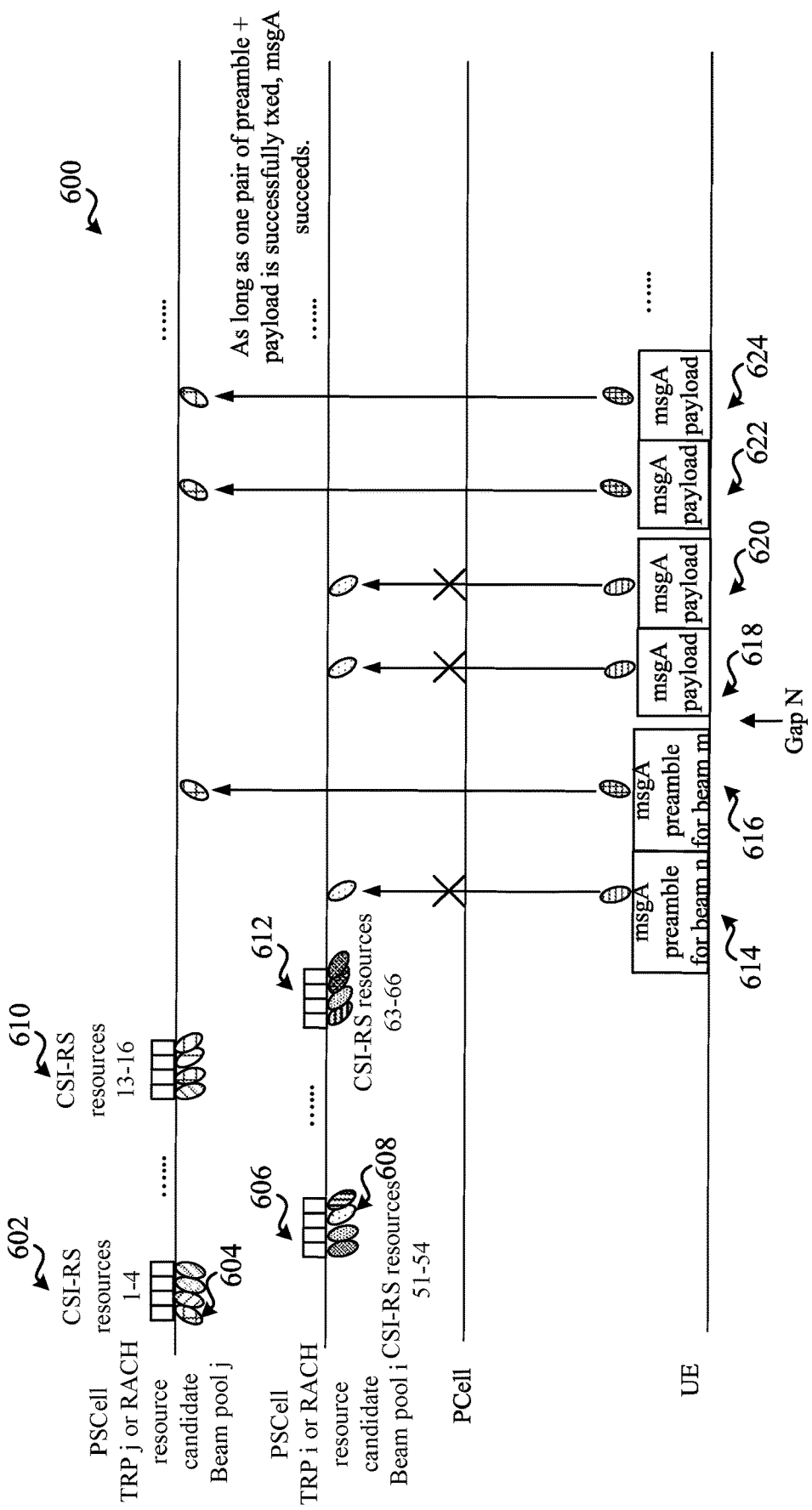
FIG. 6 illustrates a first example of a timeline for transmitting a first random access message based on multiple beams, in accordance with various aspects of the present disclosure.

FIG. 6 illustrates an example of a timeline 600 for transmitting RA messages in accordance with aspects described herein. In an example, timeline 600 can correspond NSA mode CFRA for connection set up on SCG in NR-DC. During timeline 600, first PSCell TRP can transmit multiple CSI-RS beams in a first beam pool at 602, which can include beam 604, a second PSCell TRP can transmit multiple CSI-RS beams in a second beam pool at 606, which can include beam 608, the first PSCell TRP can transmit multiple CSI-RS beams in a third beam pool at 610, and the second PSCell TRP can transmit multiple CSI-RS beams in a fourth beam pool at 612. In an example, the UE can determine which of the multiple CSI-RS beams have desirable signal properties and can select the beams for transmitting the first RA message. In this example, the UE can select a beam 604 from the first TRP and a beam 608 from the second TRP (though in other examples, the UE can select the beam n beams regardless of TRP, a beam from each of multiple beam pools, etc., as described above).

The UE can transmit the preamble portion for the first RA message (msgA preamble) based on the first beam (e.g., using a beam similar to beam 608) at 614 and the preamble portion for the second RA message based on the second beam at 616 (e.g., using a beam similar to beam 604). For example, the first beam 614 can correspond to the beam 608 (e.g., can be a reciprocal beam for transmitting from the UE that is similar to the beam 608 received from the base station). Similarly, for example, the second beam 616 can correspond to the beam 604 (e.g., can be a reciprocal beam for transmitting from the UE that is similar to the beam 604 received from the base station). Similarly, for example, the second TRP can attempt to receive the preamble portion based on a receive beam that is the same as, or similar or reciprocal to, beam 608 (but this reception may fail), and/or the first TRP can receive the preamble portion based on a receive beam that is the same as, or similar or reciprocal to, beam 604, as shown.

After a gap N between the preamble portion and payload portion transmissions of the first RA message, the UE can transmit a first transmission of the payload portion (e.g., msgA PUSCH) of the first instance based on the first beam at Block 618, and can transmit a second transmission of the payload portion of the first instance based on the first beam at Block 620, both of which may not be successfully received by the second TRP. The UE can then transmit a first transmission of the payload portion of the second instance based on the second beam at Block 622, and can transmit a second transmission of the payload portion of the second instance based on the second beam at Block 624, which may be received by the first TRP.

For example, the minimum transmission gap, N, between the end of msgA preamble and the beginning of msgA PUSCH can be defined as no less than N symbols (or N slots of symbols, N milliseconds, or other measure of time) between the last msgA preamble and the first msgA PUSCH. For example, a symbol can correspond to an orthogonal frequency division multiplexing (OFDM) symbol, single-carrier frequency division multiplexing (SC-FDM) symbol, or similar symbol defined as a portion of frequency over a portion of time. In an example, msgA preamble and msgA PUSCH can have different beam sweep pattern, e.g. PCell can allocate two beam sweeps for msgA preamble but repetition of two for each of the two beams for msgA PUSCH, as shown in FIG. 6. For example, the PCell can allocate the different beam sweeps due to high link budget requirement. Under this case, preamble to PUSCH occasion mapping can be changed to be 1:2—each PRACH preamble mapped to two valid PUSCH occasions, though substantially any ratio of preamble to payload portion may be possible.

In one example, in transmitting the multiple instances of the first RA message at Block 412, optionally at Block 418, the UE can transmit, for each of the multiple instances, the preamble portion followed by the payload portion. In an aspect, communicating component 242, e.g., in conjunction with processor(s) 212, memory 216, transceiver 202, etc., can transmit, for each of the multiple instances, the preamble portion followed by the payload portion. In this example, communicating component 242 can transmit a preamble portion of a first instance based on a first beam, followed by one or more transmissions of a payload portion of the first instance based on the first beam, and then can transmit a preamble portion of a second instance based on a second beam, followed by one or more transmissions of a payload portion of the second instance based on the second beam, etc. An example is shown in FIG. 7.

Figure 7:
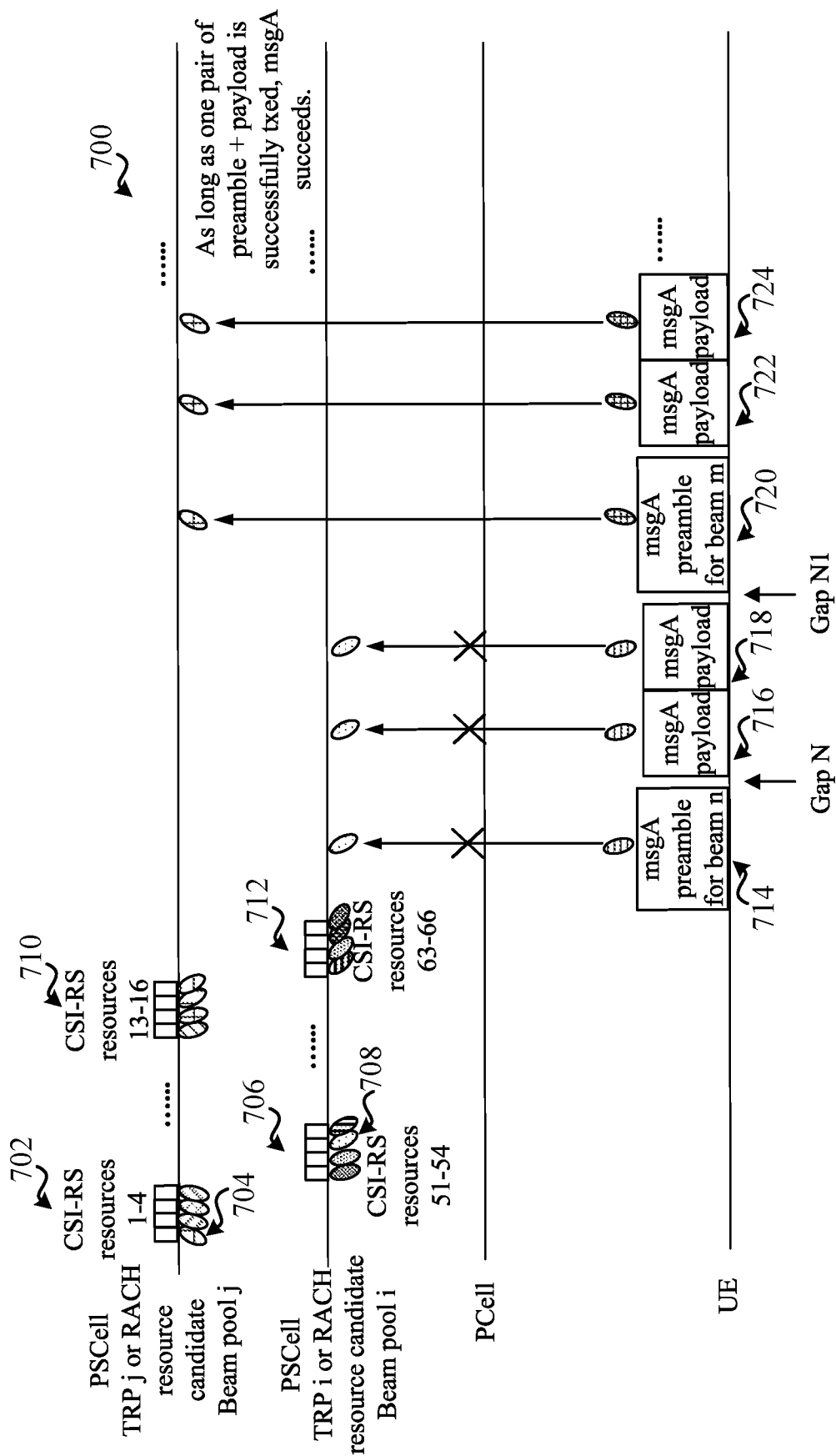
FIG. 7 illustrates a second example of a timeline for transmitting a first random access message based on multiple beams, in accordance with various aspects of the present disclosure.

FIG. 7 illustrates an example of a timeline 700 for transmitting RA messages in accordance with aspects described herein. In an example, timeline 700 can correspond NSA mode CFRA for connection set up on SCG in NR-DC. During timeline 700, first PSCell TRP can transmit multiple CSI-RS beams in a first beam pool at 702, which can include beam 704, a second PSCell TRP can transmit multiple CSI-RS beams in a second beam pool at 706, which can include beam 708, the first PSCell TRP can transmit multiple CSI-RS beams in a third beam pool at 710, and the second PSCell TRP can transmit multiple CSI-RS beams in a fourth beam pool at 712. In an example, the UE can determine which of the multiple CSI-RS beams have desirable signal properties and can select the beams for transmitting the first RA message. In this example, the UE can select a beam 704 from the first TRP and a beam 708 from the second TRP (though in other examples, the UE can select the beam n beams regardless of TRP, a beam from each of multiple beam pools, etc., as described above).

The UE can transmit the preamble portion for the first RA message (msgA preamble) based on the first beam (e.g., using a beam similar to beam 708) at 714, and, after a gap N can transmit a first transmission of a payload portion (msgA PUSCH) based on the first beam at 716, and a second transmission of the payload portion based on the first beam at 718. After another gap NI, the UE can transmit the preamble portion for the second RA message (msgA preamble) based on the second beam (e.g., using a beam similar to beam 704) at 720 (which may be followed by preamble portion(s) for one or more other RA messages, etc., in one example). After a gap N can transmit a first transmission of a payload portion (msgA PUSCH) based on the second beam at 722, and a second transmission of the payload portion based on the second beam at 724 (which may be followed by payload portion(s) for one or more other RA messages, etc., in one example). Similarly, for example, the second TRP can attempt to receive the preamble portion 714 and the two transmissions of the payload portion 716, 718 based on a receive beam that is the same as, or similar or reciprocal to, beam 708 (but this reception may fail), and/or the first TRP can receive the preamble portion 720 and the two transmissions of the payload portion 722, 724 based on a receive beam that is the same as, or similar or reciprocal to, beam 704, as shown.

For example, the minimum transmission gap between the end of msgA preamble and the beginning of msgA PUSCH, N, can stay the same. The minimum transmission gap, NI, may be defined between the end of msgA PUSCH and the next msgA preamble. In addition, for example, msgA preamble and msgA PUSCH can have different beam sweep pattern in each pair, e.g. in each pair, PCell can allocate one beam for msgA preamble but repetition of 2 for msgA PUSCH, as shown in FIG. 7. For example, PCell can allocate the different beam sweeps due to high link budget requirement. Under this case, preamble to PUSCH occasion mapping can be changed to be 1:2—each PRACH preamble mapped to two valid PUSCH occasions, though substantially any ratio of preamble to payload portion may be possible.

In method 500, at Block 506, one or more instances of a first RA message can be received with one or more TRPs, from a UE as part of a RA procedure. In an aspect, msgA processing component 352, e.g., in conjunction with processor(s) 312, memory 316, transceiver 302, configuring component 342, etc., can receive with one or more TRPs, from a UE as part of a RA procedure, and/or process one or more instances of the first RA message. For example, msgA processing component 352 can receive at least one preamble portion and at least one payload portion of the first RA message transmitted by the UE 104, and where at least one of each is received, msgA processing component 352 can decode and/or process the first RA message and continue with the RA procedure. In one example, msgA processing component 352 can receive a preamble portion of one of the multiple instances but may not receive a payload portion.

In method 500, at Block 508, multiple beams to use in transmitting messages in the RA procedure can be determined. In an aspect, msgB generating component 354, e.g., in conjunction with processor(s) 312, memory 316, transceiver 302, configuring component 342, etc., can determine the multiple beams to use in transmitting messages in the RA procedure. For example, msgB generating component 354 can determine the multiple beams based on beams over which the first RA message is received from the UE, based on the RS beams transmitted to the UE (e.g., in Block 502), based on beams indicated by the UE, etc. For example, msgB generating component 354 can determine the beams to transmit from each of multiple TRPs that provide the cell. In an example, msgB generating component 354 can determine the multiple beams based on determining beams associated with the first RA message, such as beams indicated by time or frequency resources over which the one or more instances of the first RA message are received, beams indicated by RA preambles of the one or more instances of the first RA message, beams indicated as beam identifiers in the one or more instances of the first RA message, etc.

In one example, in determining the multiple beams at Block 508, optionally at Block 510, the multiple beams can be determined to include, for one TRP, at least a first beam from a first beam pool index and a second beam from a second beam pool index. In an aspect, msgB generating component 354, e.g., in conjunction with processor(s) 312, memory 316, transceiver 302, configuring component 342, etc., can determine the multiple beams to include, for one TRP, at least the first beam from the first beam pool index and the second beam from the second beam pool index. For example, msgB generating component 354 can determine the multiple beams for a given TRP to include beams from different beam pool indices. In this example, msgB generating component 354 can determine at least one beam from a first beam pool (and associated beam pool index) and at least one beam from a second pool (and associated beam pool index) to use in transmitting random access messages. For example, msgB generating component 354 can determine a first beam index indicated by a first instance of the first RA message, and can determine the at least one beam from the first beam pool as a beam corresponding to the first beam index in the first beam pool, and msgB generating component 354 can determine a second beam index indicated by a second instance of the first RA message, and can determine the at least one beam from the second beam pool as a beam corresponding to the second beam index in the second beam pool, etc.

In one example, in determining the multiple beams at Block 508, optionally at Block 512, the multiple beams can be determined to include a first beam from a first TRP and a second beam from a second TRP. In an aspect, msgB generating component 354, e.g., in conjunction with processor(s) 312, memory 316, transceiver 302, configuring component 342, etc., can determine the multiple beams to include the first beam from the first TRP and the second beam from the second TRP. For example, msgB generating component 354 can determine the multiple beams to include beams from different TRPs. For example, each TRP can broadcast beams from one or more beam pools by transmitting a number of beams (e.g., four beams) from a first TRP, followed by the number of beams from the second TRP, etc. In this example, msgB generating component 354 can determine at least one beam from the first TRP and at least one beam from the second TRP to use in transmitting random access messages based on the one or more received instances of the first RA message. For example, msgB generating component 354 can determine a first beam indicated by a first instance of the first RA message as corresponding a beam of the first TRP, and msgB generating component 354 can determine a second beam indicated by a second instance of the first RA message as corresponding to a beam of the second TRP.

In another example, in method 500, optionally at Block 514, an indication of the multiple beams can be received from the UE. In an aspect, msgB generating component 354, e.g., in conjunction with processor(s) 312, memory 316, transceiver 302, configuring component 342, etc., can receive, from the UE, an indication of the multiple beams. As described, for example, the UE can indicate a set of desirable beams based on receiving and measuring beams from the multiple TRPs. In one example, the indication of the beams may be indicated in the first RA message received from the UE 104 or can be indicated in other signaling from the UE. In any case, msgB generating component 354 can determine the multiple beams for generating the second RA message for transmitting to the UE 104 in response to the first RA message.

For example, the UE 104 may transmit a measurement report, which may indicate desirable beams or measurements of the RSs received based on the multiple beams. In this example, msgB generating component 354 may determine the multiple beams based on the measurement report. In one example, msgB generating component 354 may determine a number of most desirable beams, which may include determining one beam from each of multiple beam pools, one beam for each of multiple TRPs, etc. In another example, msgA processing component 352 can determine beams for receiving the multiple instances of msgA based on a RA occasion during which at least the preamble portion is received from the UE 104 (e.g., where the RA occasions and/or related resources can be associated with the RS beams, as described above). In any case, msgA processing component 352 can accordingly determine when the UE 104 is transmitting the portions of msgA based on which beam, etc., as shown in FIGS. 6 and 7 above.

In an example, the SCell can transmit multiple instances of msgB, each of which may include a control channel portion (e.g., PDCCH) and a data channel portion (e.g., PDSCH, which may indicate successRAR, fallbackRAR, etc.) and may transmit msgB in TDM/FDM/SDM mode with beam sweeping from one or multiple TRPs and from one or multiple beam pool indices, etc., as described above with respect to msgA. In an example, the RAR window can be extended up to 40 ms for 2-step RACH and/or can start after the last sweep/repetition of msgA. As long as one pair of preamble and payload succeeds, for example, the base station 102 can transmit msgB using a full beam sweep.

In method 500, at Block 516, multiple instances of a second RA message can be transmitted with one or multiple TRPs, to the UE and in response to the first RA message, based on the multiple beams. In an aspect, configuring component 342, e.g., in conjunction with processor(s) 312, memory 316, transceiver 302, etc., can transmit with one or multiple TRPs, to the UE and in response to the first RA message, multiple instances of the second RA message based on the multiple beams. For example, configuring component 342 can transmit the multiple instances of the second RA messages to include, for each instance, at least one control channel portion (e.g., PDCCH) and at least one data channel portion (e.g., PDSCH, which may include successRAR or fallbackRAR), where each instance can be based on one of the multiple beams.

In transmitting the multiple instances of the second RA message at Block 516, optionally at Block 518, the second RA message can be transmitted using the same or different beams as the first RA message. In an aspect, configuring component 342, e.g., in conjunction with processor(s) 312, memory 316, transceiver 302, etc., can transmit the second RA message using the same or different beams as the first RA message. In one example, configuring component 342 can transmit msgB PDCCH based on beams of the best n RSs selected during the RACH measurement, used for receiving msgA. In another example, configuring component 342 can transmit msgB PDCCH based on beams of one best RS out of each RACH resource candidate beam pool (e.g., RRC defined and configured RS index per beam pool index), used for receiving msgA. Using beams from each beam pool can solve potential misalignment problems in the previous example where n best beams are selected. In addition, this example can apply to both single TRP and mTRP cases. In yet another example, configuring component 342 can transmit msgB PDCCH with different beams than the ones used for receiving msgA.

In another example, configuring component 342 can transmit msgB using different beams that are configured by the cell or received from the UE 104. For example, method 400 can optionally include, at Block 420, transmitting an indication of one or more different beams to the one or more TRPs. In an aspect, communicating component 242, e.g., in conjunction with processor(s) 212, memory 216, transceiver 202, etc., can transmit the indication of the one or more different beams to the one or more TRPs. For example, communicating component 242 may measure the beams between transmitting the first random access message and receiving the second random access message, and can transmit the indication of the one or more different beams by transmitting the measurement report. In this example, in method 500, optionally at Block 520, an indication of one or more different beams can be received from the UE. In an aspect, configuring component 342, e.g., in conjunction with processor(s) 312, memory 316, transceiver 302, etc., can receive, from the UE, the indication of the one or more different beams (e.g., in the measurement report).

For example, msgB generating component 354 may determine that the UE reports better beams (e.g., beams having more desirable corresponding signal measurements at the UE) before msgB transmission or that the PCell instructs the UE to use better beam(s). In another example, where the signal strength of received msgA is low (e.g., does not achieve a threshold), PCell can instruct the SCell to use different beam(s). In either case, msgB generating component 354 may determine to use different beams for msgB transmission than used for msgA reception, and can accordingly transmit msgB based on the different beams. An example is shown in FIG. 8.

Figure 8:
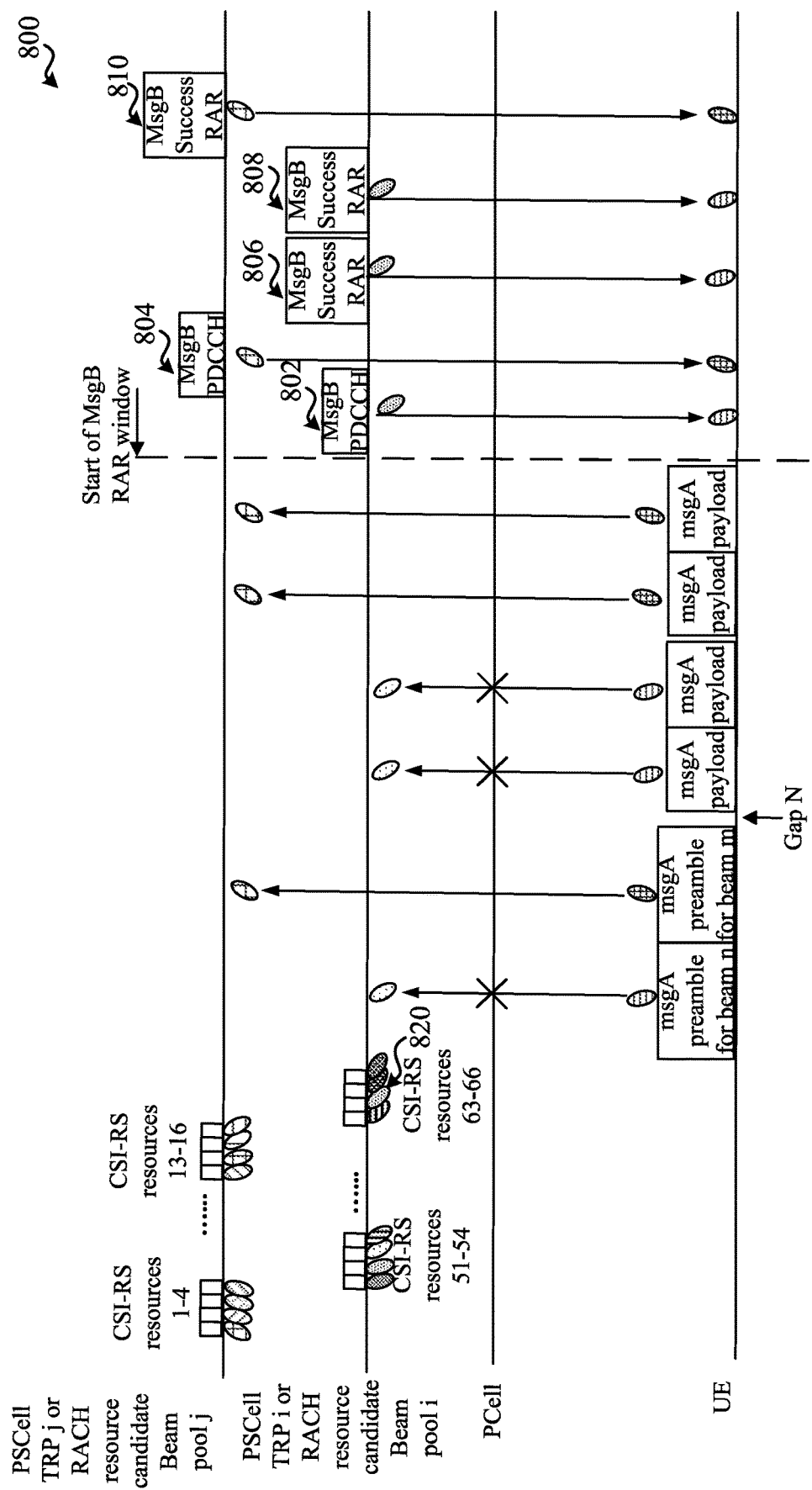
FIG. 8 illustrates an example of a timeline for transmitting a second random access message based on multiple beams, in accordance with various aspects of the present disclosure.

FIG. 8 illustrates an example of a timeline 800 for transmitting RA messages in accordance with aspects described herein. In an example, timeline 800 can correspond NSA mode CFRA for connection set up on SCG in NR-DC. During timeline 800, the RS beams can be received from the first PSCell TRP and the second PSCell TRP, as described above, and first RA message can be transmitted, as described above. In addition, for example, a second PSCell TRP can transmit, in response to the first RA message, a control channel portion 802 of the second RA message based on a first beam, and a first PSCell TRP can transmit, in response to the first RA message, a control channel portion 804 of the second RA message based on a second beam. For example, the first beam can be beam 820, which the second TRP can select based on determining that the first RA message received based on the initial beam was not received or otherwise based on determining that beam 820 is preferable/desirable over the initial beam (e.g., based on a report received from the UE, a determination by the TRP, etc., as described above). The second beam can be similar to the beam by which the second RA message was received from the first TRP. In addition, the second PSCell TRP can transmit a first transmission of a data channel portion 806 of the second RA message based on the first beam and a second transmission of a data channel portion 808 of the second RA message based on the first beam. The first PSCell TRP can transmit the data channel portion 810 of the second RA message based on the second beam.

For example, a SCell can transmit multiple msgB Success/FallbackRAR in TDM/FDM/SDM with beam sweeping from one or multiple TRPs and from one or multiple beam pool indices. In one example, the SCell can use the same beams as msgB PDCCHs, or can be scheduled with different beams or repetition pattern via msgB PDCCH. In an example, each msgB PDCCH can carry the resource allocation information for multiple msgB PDSCHs, so that under the case of loss of one msgB PDCCH, the rest of RACH path still can continue without any impact. The same rule can apply for msgB successRAR or fallbackRAR.

In an example, in transmitting the second RA message at Block 516, optionally at Block 522, a successRAR or a fallbackRAR can be transmitted. In an aspect, configuring component 342, e.g., in conjunction with processor(s) 312, memory 316, transceiver 302, etc., can transmit the successRAR or the fallbackRAR. For example, where msgA processing component 352 receives and processes the preamble and payload portion of one or more instances of the first RA message, msgB generating component 354 can generate the second RA message to include successRAR, and configuring component 342 can accordingly transmit the successRAR. In an example, where msgA processing component 352 receives and processes a preamble portion but not a payload portion of one or more instances of the first RA message (e.g., at least one preamble portion is received and processed but no payload portions are received or processed), msgB generating component 354 can generate the second RA message to include fallbackRAR, and configuring component 342 can accordingly transmit the fallbackRAR. The fallbackRAR can be similar to MAC RAR of four-step RACH and may include parameters for retying transmission of at least the payload portion the first RA message to the one or more TRPs, etc., such as resources for transmitting, beams to use for transmitting, a beam pattern for transmitting the beams, etc. The UE can accordingly retransmit at least the payload portion of the first RA message and can monitor for contention resolution from the one or more TRPs. The successRAR can include contents described above, such as UE contention resolution identity, TPC, HARQ feedback timing indicator (e.g., for transmitting feedback for msgB as described herein), PUCCH resource indicator, TA command, C-RNTI, etc.

In method 400, at Block 422, the UE can receive, from at least one TRP of the one or more TRPs and in response to the first RA message, one or more instances of a second RA message. In an aspect, msgB processing component 254, e.g., in conjunction with processor(s) 212, memory 216, transceiver 202, communicating component 242, etc., can receive, from at least one TRP of the one or more TRPs and in response to the first RA message, one or more instances of the second RA message. As described, msgB processing component 254 can receive, and process, a control channel portion and/or a data channel portion of the msgB, and can receive one or more instances of the control channel portion and/or one or more instances of the data channel portion based on one or more beams.

In receiving the second RA message at Block 422, optionally at Block 424, the UE can receive the second RA message based on a different beam not included in the multiple beams. In an aspect, msgB processing component 254, e.g., in conjunction with processor(s) 212, memory 216, transceiver 202, communicating component 242, etc., can receive the second RA message based on a different beam not included in the multiple beams that were used to transmit the first RA message. For example, the cell can configure, based on UE reporting or otherwise, different beams for transmitting the msgB, as described. In an example, msgB processing component 254 can receive an indication of the different beams from the cell or can otherwise determine the different beams to use for receiving msgB.

In addition, in receiving the second RA message at Block 422, optionally at Block 426, the UE can receive a successRAR or a fallbackRAR. In an aspect, msgB processing component 254, e.g., in conjunction with processor(s) 212, memory 216, transceiver 202, communicating component 242, etc., can receive the successRAR or the fallbackRAR as the second RA message from the cell.

In method 400, optionally at Block 428, at least the payload portion of the first RA message can be retransmitted. In an aspect, communicating component 242, e.g., in conjunction with processor(s) 212, memory 216, transceiver 202, etc., can retransmit at least the payload portion of the first RA message. For example, communicating component 242 can retransmit at least the payload portion of the first RA message where the fallbackRAR is received. In an example, communicating component 242 can retransmit multiple instances of the payload portion using beam sweeping based on the multiple beams used to transmit the first RA message at Block 412 or based on another set of multiple beams (e.g., which may be specified in the fallbackRAR, etc.). In addition, communicating component 242 can also adjust uplink timing for retransmitting the payload portion.

In another example, communicating component 242 can also retransmit the preamble portion (e.g., retransmit all of msgA) where no RAR is received. In this example, communicating component 242 can retransmit msgA after backoff and MAC processing latency.

In another example, in method 400, optionally at Block 430, feedback for the second RA message can be transmitted to the one or more TRPs and based on multiple feedback beams. In an aspect, feedback component 256, e.g., in conjunction with processor(s) 212, memory 216, transceiver 202, communicating component 242, etc., can transmit, to the one or more TRPs and based on multiple feedback beams, feedback for the second RA message. For example, the feedback can include HARQ feedback (e.g., acknowledgement (ACK) or negative-ACK (NACK)) on whether the second RA message is successfully received and/or decoded. In an example, feedback component 256 can transmit the feedback using beam sweeping as well, which can be based on the multiple beams used to transmit the first RA message or another set of beams (e.g., a set of beams indicated in the successRAR), etc. For example, for UE transmitting multiple HARQ-ACK in FDM/TDM/SDM with beam sweeping, the successRAR (msgB PDSCH) can also signal PUCCH resource index via 4 bits to use for transmitting the feedback. In addition, in an example, the successRAR can contain the beam sweep pattern for the HARQ-ACK, which can be the same as, or different than, msgA. For example, if signal strength is low for msgA, successRAR may enable (more) beam repetition or different beams for HARQ-ACK for improving reliability. In another example, if the base station 102 receives a recent report that indicates better beam(s) than msgA, successRAR may change the sweeping beams for HARQ-ACK, similar to the second RA message, as described above. An example is shown in FIG. 9.

Figure 9:
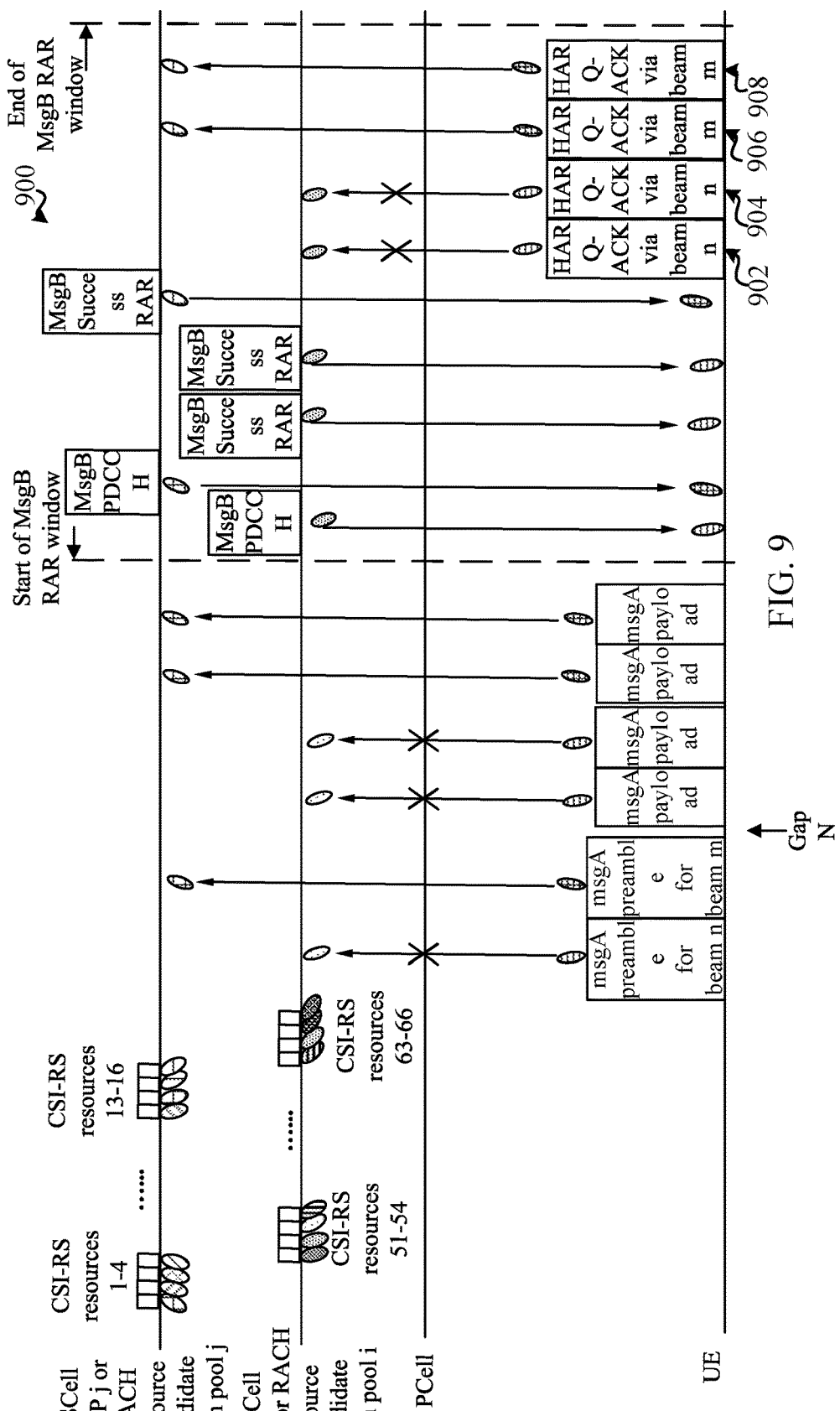
FIG. 9 illustrates an example of a timeline for transmitting feedback for a second random access message based on multiple beams, in accordance with various aspects of the present disclosure.

FIG. 9 illustrates an example of a timeline 900 for transmitting RA message feedback in accordance with aspects described herein. During timeline 900, the RS beams can be received from the first PSCell TRP and the second PSCell TRP, as described above, the first RA message and second RA message can be transmitted, as described above. In addition, for example, the UE can transmit a first transmission of feedback based on the first beam (e.g., the beam based on which the second RA message is received from the second TRP) at 902, and a second transmission of the feedback based on the first beam at 904, which the second TRP may not successfully receive, as shown. The UE can also transmit a first transmission of the feedback based on the second beam (e.g., the beam based on which the second RA message is received from the first TRP) at 906, and a second transmission of the feedback based on the second beam at 908. The first TRP may successfully receive the feedback. As described, where at least one TRP receives the feedback, the RA procedure can be completed.

In method 500, optionally at Block 524, one or more instances of feedback for the second RA message can be received from the UE. In an aspect, feedback processing component 356, e.g., in conjunction with processor(s) 312, memory 316, transceiver 302, configuring component 342, etc., can receive, from the UE, and/or process one or more instances of feedback for the second RA message. For example, feedback processing component can receive the feedback and can accordingly determine whether to retransmit the second RA message.

Figure 10:
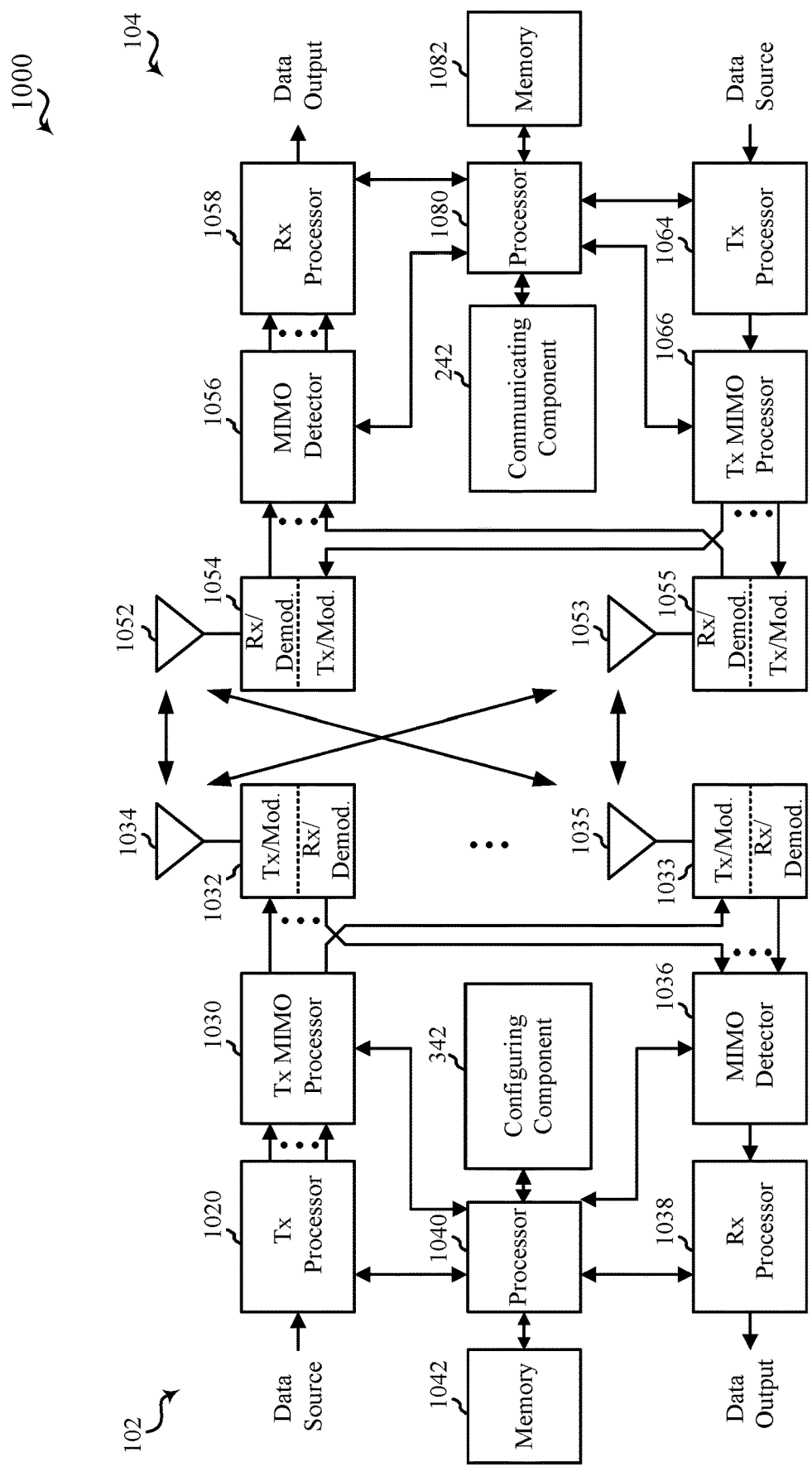
FIG. 10 is a block diagram illustrating an example of a MIMO communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a communicating component 242 (see e.g., FIGS. 1 and 2).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1000.

The following aspects are illustrative only and aspects thereof may be combined with aspects of other embodiments or teaching described herein, without limitation.

Aspect 1 is a method for wireless communications including determining multiple beams to use in transmitting messages in a random access procedure with one or more TRPs of a cell, and transmitting, to the one or more TRPs of the cell, multiple instances of a first random access message based on the multiple beams, where each of the multiple instances of the first random access message include a preamble portion and a payload portion.

In Aspect 2, the method of Aspect 1 includes where the cell is a SCell for the UE, or a PSCell for the UE.

In Aspect 3, the method of any of Aspects 1 or 2 includes where the multiple beams include, for one TRP of the cell, at least a first beam from a first beam pool index and a second beam from a second beam pool index.

In Aspect 4, the method of any of Aspects 1 to 3 includes where the multiple beams include a first beam from a first TRP index of the cell and a second beam from a second TRP index of the cell.

In Aspect 5, the method of any of Aspects 1 to 4 includes where transmitting the multiple instances of the first random access message includes transmitting the multiple instances based on the multiple beams using at least one of time division multiplexing, frequency division multiplexing, or space division multiplexing to separate the multiple beams.

In Aspect 6, the method of any of Aspects 1 to 5 includes where the preamble portion of each of the multiple instances of the first random access message include multiple preamble transmissions.

In Aspect 7, the method of any of Aspects 1 to 6 includes where the payload portion of each of the multiple instances of the first random access message include multiple payload transmissions.

In Aspect 8, the method of any of Aspects 1 to 7 includes where determining the multiple beams includes determining a set of beams based on reference signals received from the one or more TRPs.

In Aspect 9, the method of any of Aspects 1 to 8 includes where transmitting the multiple instances of the first random access message comprises transmitting the preamble portion of each of the multiple instances of the first random access message followed by transmitting the payload portion of each of the multiple instances of the first random access message based on the multiple beams.

In Aspect 10, the method of Aspect 9 includes where the multiple beams include a number of transmitting beams for multiple reference signals corresponding to a number of receiving beams from the cell during a corresponding number of allocated random access occasions, with each random access occasion being associated to one of the multiple reference signals for receiving the preamble portion.

In Aspect 11, the method of Aspect 10 includes where the multiple reference signals include at least one of a SSB or a CSI-RS from the cell.

In Aspect 12, the method of any of Aspects 9 to 11 includes where transmitting the multiple instances of the first random access message includes transmitting the preamble portion of each of the multiple instances of the first random access message according to a first beam sweep pattern and transmitting the payload portion of each of the multiple instances of the first random access message according to a second beam sweep pattern.

In Aspect 13, the method of any of Aspects 1 to 12 includes where transmitting the multiple instances of the first random access message comprises transmitting, for each of the multiple instances of the first random access message, the preamble portion followed by the payload portion.

In Aspect 14, the method of Aspect 13 includes where transmitting, for each of the multiple instances of the first random access message, the preamble portion followed by the payload portion includes transmitting the preamble portion according to a first beam sweep pattern and transmitting the payload portion according to a second beam sweep pattern.

In Aspect 15, the method of any of Aspects 1 to 14 includes receiving, from at least one TRP of the one or more TRPs and in response to the first random access message, one or more instances of a second random access message.

In Aspect 16, the method of Aspect 15 includes where the one or more instances of the second random access message are received based on at least one of the multiple beams.

In Aspect 17, the method of any of Aspects 15 or 16 includes where the one or more instances of the second random access message are received based on a different beam not included in the multiple beams, where the different beam is at least one of reported to the one or more TRPs or configured by the one or more TRPs.

In Aspect 18, the method of any of Aspects 15 to 17 includes where the second random access message includes at least a control channel portion that indicates resources used for a shared channel portion.

In Aspect 19, the method of Aspect 18 includes where the shared channel portion includes a random access response indicating a successful random access response or a fallback random access response.

In Aspect 20, the method of any of Aspects 15 to 19 includes where the second random access message indicates a uplink control channel resources for transmitting feedback for receiving the second random access message, and further comprising transmitting the feedback over the uplink control channel resources.

In Aspect 21, the method of Aspect 20 includes where transmitting the feedback includes transmitting multiple instances of the feedback based on multiple feedback beams.

In Aspect 22, the method of Aspect 21 includes where the second random access message indicates at least one of the multiple feedback beams or a beam pattern for transmitting the multiple feedback beams.

In Aspect 23, the method of any of Aspects 21 or 22 includes determining the multiple feedback beams to be the same as the multiple beams.

Aspect 24 is a method for wireless communications including receiving with one or multiple TRPs, from a UE as part of a random access procedure, one or more instances of a first random access message, where each of the one or more instances of the first random access message include a preamble portion and a payload portion, determining multiple beams to use in transmitting messages in the random access procedure, and transmitting with one or multiple TRPs, to the UE and in response to the first random access message, multiple instances of a second random access message based on the multiple beams.

In Aspect 25, the method of Aspect 24 includes where the multiple beams include, for one TRP, at least a first beam from a first beam pool index and a second beam from a second beam pool index.

In Aspect 26, the method of any of Aspects 24 or 25 includes where the multiple beams include a first beam that corresponds to a first TRP index of the one or more TRPs and a second beam that corresponds to a second TRP index of the one or more TRPs, and where transmitting the multiple instances of the second random access message comprises transmitting, by the first TRP, a first instance of the second random access message based on at least the first beam and transmitting, by the second TRP, a second instance of the second random access message based on at least the second beam.

In Aspect 27, the method of any of Aspects 24 to 27 includes where transmitting the multiple instances of the second random access message includes transmitting the multiple instances based on the multiple beams using at least one of time division multiplexing, frequency division multiplexing, or space division multiplexing to separate the multiple beams.

In Aspect 28, the method of any of Aspects 24 to 28 includes where the multiple beams correspond to multiple receive beams over which the one or more instances of the first random access message are received from the UE.

In Aspect 29, the method of any of Aspects 24 to 29 includes where the multiple beams correspond to at least a first receive beam from a first beam pool over which a first instance of the first random access message is received from the UE and at least a second beam from a second beam pool over which a second instance of the first random access message is received from the UE.

In Aspect 30, the method of any of Aspects 24 to 30 includes where the multiple beams are different from multiple receive beams over which the one or more instances of the first random access message are received from the UE.

In Aspect 31, the method of Aspect 30 includes at least one of receiving a report from the UE indicating the multiple beams, or indicating the multiple beams to the UE.

In Aspect 32, the method of any of Aspects 24 to 31 includes where the second random access message includes a control channel portion and a data channel portion, where the control channel portion indicates resources for the data channel portion.

In Aspect 33, the method of Aspect 32 includes where the data channel portion includes a random access response indicating a successful random access response or a fallback random access response.

In Aspect 34, the method of any of Aspects 32 or 33 includes where the control channel portion indicates resources for all of the data channel portions of each of the multiple instances of the second random access message.

In Aspect 35, the method of any of Aspects 32 to 24 includes where transmitting the multiple instances of the second random access message includes, for each of the multiple instances, transmitting the data channel portions using the same beams as the control channel portion.

In Aspect 36, the method of any of Aspects 32 to 25 includes where transmitting the multiple instances of the second random access message includes, for each of the multiple instances, transmitting the data channel portions using different beams than the control channel portion.

In Aspect 37, the method of Aspect 36 includes where the control channel portion indicates a beam used for transmitting the data channel portion.

In Aspect 38, the method of any of Aspects 24 to 37 includes receiving, from the UE, one or more instances of feedback for the second random access message.

In Aspect 39, the method of Aspect 38 includes where the second random access message indicates resources over which to transmit the one or more instances of feedback.

In Aspect 40, the method of any of Aspects 38 or 39 includes where the second random access message indicates at least one of multiple feedback beams to use in transmitting the one or more instances of feedback or a beam pattern for transmitting the multiple feedback beams.

Aspect 41 is an apparatus for wireless communication including a transceiver, a memory configured to store instructions, and one or more processors coupled with the memory and the transceiver, where the one or more processors are configured to perform one or more of the methods of any of Aspects 1 to 40.

Aspect 42 is an apparatus for wireless communication including means for performing one or more of the methods of any of Aspects 1 to 40.

Aspect 43 is a computer-readable medium including code executable by one or more processors for wireless communications, the code including code for performing one or more of the methods of any of Aspects 1 to 40.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software (e.g., executed by a processor), or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. If implemented in software (e.g., executed by a processor), the functions may be stored on or transmitted over as one or more instructions or code on a non-transitory computer-readable medium. Other examples and implementations are within the scope and spirit of the disclosure and appended claims. For example, due to the nature of software, functions described above can be implemented using software (e.g., executed by a specially programmed processor), hardware, hardwiring, or combinations of any of these. Features implementing functions may also be physically located at various positions, including being distributed such that portions of functions are implemented at different physical locations. Also, as used herein, including in the claims, "or" (e.g., as used in a list of items prefaced by "at least one of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors coupled with the memory and the transceiver, wherein the one or more processors are configured to:
select multiple beams to use in transmitting messages in a random access procedure with one or more transmission/reception points (TRPs) of a cell; and
transmit, to the one or more TRPs of the cell, multiple instances of a first random access message based on the multiple beams, the first random access message including a preamble portion and a payload portion, wherein transmitting each of the multiple instances of the first random access message includes:
transmitting, based on one of the multiple beams, a preamble portion of the respective instance of the first random access message; and
transmitting, based on the one of the multiple beams and after a transmission gap in time from the preamble portion, a payload portion of the respective instance of the first random access message.

2. The apparatus of claim 1, wherein the cell is a secondary cell (SCell) for the apparatus, or a primary secondary cell (PSCell) for the apparatus.

3. The apparatus of claim 1, wherein the multiple beams include, for one TRP of the cell, at least a first beam from a first beam pool index and a second beam from a second beam pool index.

4. The apparatus of claim 1, wherein the multiple beams include a first beam from a first TRP index of the cell and a second beam from a second TRP index of the cell.

5. The apparatus of claim 1, wherein the one or more processors are configured to transmit the multiple instances of the first random access message based on the multiple beams using at least one of time division multiplexing, frequency division multiplexing, or space division multiplexing to separate the multiple beams.

6. The apparatus of claim 1, wherein the preamble portion of each of the multiple instances of the first random access message include multiple preamble transmissions.

7. The apparatus of claim 1, wherein the payload portion of each of the multiple instances of the first random access message include multiple payload transmissions.

8. The apparatus of claim 1, wherein the one or more processors are configured to select the multiple beams as a set of beams based on reference signals received from the one or more TRPs.

9. The apparatus of claim 1, wherein the multiple beams include a number of transmitting beams for multiple reference signals corresponding to a number of receiving beams from the cell during a corresponding number of allocated random access occasions, with each random access occasion being associated to one of the multiple reference signals for receiving the preamble portion.

10. The apparatus of claim 9, wherein the multiple reference signals include at least one of a synchronization signal block (SSB) or a channel state information-reference signal (CSI-RS) from the cell.

11. The apparatus of claim 1, wherein the one or more processors are further configured to receive, from at least one TRP of the one or more TRPs and in response to the first random access message, one or more instances of a second random access message.

12. The apparatus of claim 11, wherein the one or more instances of the second random access message are received based on at least one of the multiple beams.

13. The apparatus of claim 11, wherein the one or more instances of the second random access message are received based on a different beam not included in the multiple beams, wherein the different beam is at least one of: reported to the one or more TRPs; or configured by the one or more TRPs.

14. The apparatus of claim 11, wherein the second random access message includes at least a control channel portion that indicates resources used for a shared channel portion.

15. The apparatus of claim 14, wherein the shared channel portion includes a random access response indicating a successful random access response or a fallback random access response.

16. The apparatus of claim 11, wherein the second random access message indicates a uplink control channel resources for transmitting feedback for receiving the second random access message, and wherein the one or more processors are further configured to transmit the feedback over the uplink control channel resources.

17. The apparatus of claim 16, wherein the one or more processors are configured to transmit multiple instances of the feedback based on multiple feedback beams.

18. The apparatus of claim 17, wherein the second random access message indicates at least one of the multiple feedback beams or a beam pattern for transmitting the multiple feedback beams.

19. The apparatus of claim 17, wherein the one or more processors are further configured to determine the multiple feedback beams to be the same as the multiple beams.

20. An apparatus for wireless communication, comprising:
a transceiver;
a memory configured to store instructions; and
one or more processors coupled with the memory and the transceiver, wherein the one or more processors are configured to:
receive with one or multiple transmission/reception points (TRPs), from a user equipment (UE) as part of a random access procedure, multiple instances of a first random access message, the first random access message including a preamble portion and a payload portion, wherein receiving each of the multiple instances of the first random access message includes:
receiving, based on one of multiple receive beams, a preamble portion of the respective instance of the first random access message; and
receiving, based on the one of the multiple receive beams and after a transmission gap in time from the preamble portion, a payload portion of the respective instance of the first random access message;
determine multiple beams to use in transmitting messages in the random access procedure; and
transmit with one or multiple TRPs, to the UE and in response to the first random access message, multiple instances of a second random access message based on the multiple beams.

21. The apparatus of claim 20, wherein the multiple beams include, for one TRP, at least a first beam from a first beam pool index and a second beam from a second beam pool index.

22. The apparatus of claim 20, wherein the multiple beams include a first beam that corresponds to a first TRP index of the one or multiple TRPs and a second beam that corresponds to a second TRP index of the one or multiple TRPs, and wherein the one or more processors are configured to transmit the multiple instances of the second random access message at least in part by transmitting, by a first TRP, a first instance of the second random access message based on at least the first beam and transmitting, by a second TRP, a second instance of the second random access message based on at least the second beam.

23. The apparatus of claim 20, wherein the one or more processors are configured to transmit the multiple instances of the second random access message at least in part by transmitting the multiple instances based on the multiple beams using at least one of time division multiplexing, frequency division multiplexing, or space division multiplexing to separate the multiple beams.

24. The apparatus of claim 20, wherein the multiple beams correspond to the multiple receive beams.

25. A method for wireless communication at a user equipment (UE), comprising:
selecting multiple beams to use in transmitting messages in a random access procedure with one or more transmission/reception points (TRPs) of a cell; and
transmitting, to the one or more TRPs of the cell, multiple instances of a first random access message based on the multiple beams, the first random access message including a preamble portion and a payload portion, wherein transmitting each of the multiple instances of the first random access message includes:
transmitting, based on one of the multiple beams, a preamble portion of the respective instance of the first random access message; and
transmitting, based on the one of the multiple beams and after a transmission gap in time from the preamble portion, a payload portion of the respective instance of the first random access message.

26. The method of claim 25, wherein the cell is a secondary cell (SCell) for the UE, or a primary secondary cell (PSCell) for the UE.

27. The method of claim 25, wherein the multiple beams include, for one TRP of the cell, at least a first beam from a first beam pool index and a second beam from a second beam pool index.

28. The method of claim 25, wherein the multiple beams include a first beam from a first TRP index of the cell and a second beam from a second TRP index of the cell.

29. The method of claim 25, wherein transmitting the multiple instances of the first random access message based on the multiple beams includes using at least one of time division multiplexing, frequency division multiplexing, or space division multiplexing to separate the multiple beams.

30. A method for wireless communication, comprising:
receiving with one or multiple transmission/reception points (TRPs), from a user equipment (UE) as part of a random access procedure, multiple instances of a first random access message, the first random access message including a preamble portion and a payload portion, wherein receiving each of the multiple instances of the first random access message includes:
  receiving, based on one of multiple receive beams, a preamble portion of the respective instance of the first random access message; and
  receiving, based on the one of the multiple receive beams and after a transmission gap in time from the preamble portion, a payload portion of the respective instance of the first random access message;
determining multiple beams to use in transmitting messages in the random access procedure; and
transmitting with one or multiple TRPs, to the UE and in response to the first random access message, multiple instances of a second random access message based on the multiple beams.

* * * * *